(12) United States Patent
Svensson et al.

(10) Patent No.: US 11,938,874 B2
(45) Date of Patent: Mar. 26, 2024

(54) CENTRALIZED CONTROLLER FOR AUTOMOTIVE USE

(71) Applicant: Volvo Car Corporation, Gothenburg (SE)

(72) Inventors: Johan Svensson, Mölnycke (SE); Richard Biveby, Gothenburg (SE); Usman Tariq, Gothenburg (SE); Carl-Johan Hall, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 998 days.

(21) Appl. No.: 16/582,498

(22) Filed: Sep. 25, 2019

(65) Prior Publication Data

US 2021/0086708 A1    Mar. 25, 2021

(51) Int. Cl.
*B60R 16/023* (2006.01)
*B60R 16/03* (2006.01)
(Continued)

(52) U.S. Cl.
CPC ............ *B60R 16/023* (2013.01); *B60R 16/03* (2013.01); *H04L 67/12* (2013.01); *H04L 12/10* (2013.01)

(58) Field of Classification Search
None
See application file for complete search history.

(56) References Cited

U.S. PATENT DOCUMENTS

| 4,503,504 A | 3/1985 | Suzumura et al. |
| 7,679,496 B2 | 3/2010 | Beneker et al. |

(Continued)

FOREIGN PATENT DOCUMENTS

| CN | 205768776 U | 12/2016 |
| CN | 108638985 A | 10/2018 |

(Continued)

OTHER PUBLICATIONS

Reinhardt D. and Kucera M. Domain Controlled Architecture—A New Approach for Large Scale Software Integrated Automotive Systems. DOI: 10.5220/0004340702210226, In Proceedings of the 3rd International Conference (PECCS-2013), pp. 221-226, ISBN: 978-989-8 (Year: 2013).*

(Continued)

*Primary Examiner* — Peter D Nolan
*Assistant Examiner* — Michael F Whalen
(74) *Attorney, Agent, or Firm* — Clements Bernard Walker; Christopher L. Bernard

(57) ABSTRACT

The present disclosure generally relates to providing a centralized controller for actuators within electronic control systems of a vehicle. An electronic control system within a vehicle computer system, having a first actuator for performing a first vehicle function, a second actuator for a performing second vehicle function and a controller coupled to the first actuator and the second actuator for controlling the first and second actuators is provided such that the controller is not embedded in either the first or second actuator. Embodiments of a centralized controller and a non-transitory machine-readable medium on which a program is stored for providing instructions to a controller that may utilize the 1-Wire® and/or PoE protocols are also provided. Advantages include, but are not limited to centralized manufacturing, simplified diagnostics, and streamlined software upgrades, all of which result in reduce costs.

20 Claims, 3 Drawing Sheets

(51) Int. Cl.
*H04L 67/12* (2022.01)
*H04L 12/10* (2006.01)

(56) References Cited

U.S. PATENT DOCUMENTS

| | | | |
|---|---|---|---|
| 11,395,458 B1* | 7/2022 | Brown | B60R 16/0231 |
| 2007/0073908 A1* | 3/2007 | Gormley | G05B 19/0421 |
| | | | 710/8 |
| 2011/0137529 A1 | 6/2011 | Locke et al. | |
| 2017/0155679 A1* | 6/2017 | Choi | G06F 3/0623 |
| 2018/0056903 A1 | 3/2018 | Mullett | |
| 2018/0056965 A1 | 3/2018 | Houtman et al. | |
| 2020/0344094 A1* | 10/2020 | Mishra | H04L 12/40 |
| 2021/0026359 A1* | 1/2021 | MacGregor | H04L 67/125 |

FOREIGN PATENT DOCUMENTS

| | | | | |
|---|---|---|---|---|
| DE | 4217664 A1 | | 12/1992 | |
| DE | 2004045392 A1 | | 3/2006 | |
| DE | 2016101093 A1 | | 7/2016 | |
| EP | 3672013 A1 | * | 6/2020 | G05B 19/042 |
| WO | 164468 A1 | | 9/2001 | |

OTHER PUBLICATIONS

Feb. 10, 2021 European Search Report issued on International U.S. Appl. No. 20/192,827.

* cited by examiner

CENTRALIZED CONTROLLER FOR AUTOMOTIVE USE

TECHNICAL FIELD

The present disclosure generally relates to electronic control systems within a vehicle. More particularly, the present disclosure relates to providing a centralized controller for streamlining the control of multiple electronic control units (ECUs), and their related actuator modules, such as electrical adjustable steering columns (wheel) and adjustable seats within a vehicle.

BACKGROUND

An Electronic Control Unit (ECU) is any embedded system in automotive electronics that controls one or more of the electrical systems or subsystems within a vehicle. Some common types of ECUs include Engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), and Suspension Control Module (SCM). Taken together, these systems are sometimes referred to as the car's computer, though technically there is no single computer within a vehicle. Instead, there are multiple ones that work to control the various electrical systems. Some modern vehicles can have up to eighty ECUs.

A typical ECU comprises a few basic elements, namely, a local microcontroller, which may be embedded in the actuator (aka a smart actuator), a stepper motor, one or more sensor(s), and a power supply. The microcontroller, or brains of the ECU, may also be referred to simply as the controller. The controller is responsible for controlling the direction, extent, and duration of the output of the actuator. Controllers are programmed to perform a particular set of functions related to its electrical system or subsystem. Conventionally, there is a separate controller for each electrical system. For example, each electrical system, such as power door locks, power windows, power seats, power steering, and power wipers may have a specific controller dedicated and programmed to manage its function. During the lifetime of the controller, that set of functions remains the same. A controller programmed to manage door locks and windows will perform those same functions over the life of the vehicle. Controllers are also designed to have some memory and processing reserve to ensure sufficient execution time and resources for all of the functions executed by the controller. In the even of a partial or complete controller failure, those functions implemented by that controller are lost. Similarly, when software updates or diagnostics are needed, each must be deployed to the controllers separately.

An actuator element is a mechanism, such as an electric motor or electro-magnetic valve, by which the ECU acts upon the environment. The actuator component typically has an embedded controller and requires a control signal and a source of energy. The control signal is relatively low energy and may be electric voltage or current, pneumatic or hydraulic pressure, or even human power. When a control signal is received, the actuator responds by converting the signal's energy into mechanical motion. As noted above, ECUs typically get their input from sensors (e g., speed, temperature, pressure, etc.) that it uses in its computation. In some electrical systems, various actuators are used to enforce the actions (e.g., turn the cooling fan on, change gear, etc.), and at times, ECUs need to exchange data between themselves during the normal operation of the vehicle. For example, a vehicle engine needs to tell the transmission what the engine speed is, and the transmission needs to tell other modules when a gear shift occurs. This need to exchange data quickly and reliably requires a communication network and an associated network protocol.

Because of the structure, distribution, and quantity controllers in the various vehicle control subsystems, managing the increasing complexity, and need for software updates in a vehicle has become a key challenge for manufacturers. This is a challenge for original equipment manufacturers (OEMs), in particular. Further, embedded software executed by conventional ECUs continues to increase in line count, complexity, and sophistication. Thus, there is a need for control systems that address the need for reduced topology, reliable communication protocols, reduced manufacturing complexity, streamlined diagnostics, simpler software updates and overall reduced costs for vehicle ECUs.

SUMMARY

Embodiments of an electronic control system within a vehicle computer system are provided. The electronic control system comprises a first actuator for performing a first vehicle function; a second actuator for a performing second vehicle function; and a controller coupled to the first actuator and the second actuator for controlling the first and second actuator, wherein the controller is not embedded in either the first or second actuator.

In an embodiment, the controller is adapted and configured to communicate over a network using a communication protocol within the vehicle computer system. The communication protocol may be selected from one of $A^2B1$, AFDX, ARINC 429, Byteflight, CAN, D2B, FlexRay, DC-BUS, IDB-1394, IEBus, $I^2C$, ISO 9141-1/-2, J1708, J1587, J1850, J1939, ISO 11783, KWP2000, LIN, MOST, Multifunction Vehicle Bus, Train Communication Network, IEC 61375, SMARTwireX, SPI, VAN and Power over Ethernet (PoE).

The first vehicle function and the second vehicle function are related to operating functions selected from the group consisting of: power door locks, power windows, power mirrors, power seats, power steering, and power wipers. In an embodiment, the first vehicle function and the second vehicle function are related to a same type of function. In another embodiment, the first vehicle function and the second vehicle function are related to a different type of function. The first actuator and the second actuator may further comprise an interface for providing a combined communications and power supply link between the controller and each of the first and second actuators. The interface may be one of a 1-Wire interface and a PWM generation interface. A multi-wire Ethernet/Power-Over-Ethernet (PoE) connection may also be utilized.

Embodiments of a controller independently coupled to a first actuator and a second actuator within a vehicle are also provided. The controller comprises: a processor for sending, receiving and processing a data; and a plurality of sensors coupled to the first actuator and the second actuator for providing data to the processor, wherein the controller is adapted and configured to send data from the processor to the first actuator to perform a first vehicle function and the second actuator to perform second vehicle function. Each of the first actuator and the second actuator may further comprise an interface for providing a combined communications and power supply link between the controller and each of the first and second actuators. The interface may be one of a 1-Wire interface and a PWM generation interface. Again, a multi-wire Ethernet/PoE connection may also be utilized.

The controller may be adapted and configured to communicate over a network using a communication protocol within the vehicle. The communication protocol is one of $A^2B1$, AFDX, ARINC 429, Byteflight, CAN, D2B, FlexRay, DC-BUS, IDB-1394, IEBus, $I^2C$, ISO 9141-1-2, J1708, J1587, J1850, J1939, ISO 11783, KWP2000, LIN, MOST, Multifunction Vehicle Bus, Train Communication Network, IEC 61375, SMARTwireX, SPI, VAN and PoE.

In an embodiment, the processor is adapted and configured to receive a software update for providing updated data to the first actuator and the second actuator related to performing the function within the vehicle. In another embodiment, the first vehicle function and the second vehicle function are related to a task associated with operating one of: power door locks, power windows, power mirrors, power seats, power steering, and power wipers. In an embodiment, the first vehicle function and the second vehicle function are related to the same task. In another embodiment, the first vehicle function and the second vehicle function are related to a different task.

Embodiments, a non-transitory machine-readable medium on which a program is stored for providing instructions to a controller within a vehicle control system, the program, when executed by a processor within the controller to perform the steps of: sending a signal to a first actuator and a second actuator within the vehicle control system, wherein the program is stored in the controller, the controller being independently coupled to a first actuator and a second actuator within the vehicle control system. In an embodiment, the controller is adapted and configured to communicate over a network using a communication protocol that is selected from the group consisting of: ABI, AFDX, ARINC 429, Byteflight, CAN, D2B, FlexRay, DC-BUS, IDB-1394, IEBus, $I^2C$, ISO 9141-1/-2, J1708, J1587, J1850, J1939, ISO 11783, KWP2000, LIN, MOST, Multifunction Vehicle Bus, Train Communication Network, IEC 61375, SMARTwireX, SPI, VAN and PoE. In yet another embodiment, the program further executes the step of performing a simultaneous software update for operation of both the first actuator and the second actuator.

BRIEF DESCRIPTION OF THE DRAWINGS

The present disclosure is illustrated and described herein with reference to the various drawings, in which like reference numbers are used to denote like system components, as appropriate, and in which.

DESCRIPTION OF EMBODIMENTS

Figure 1:
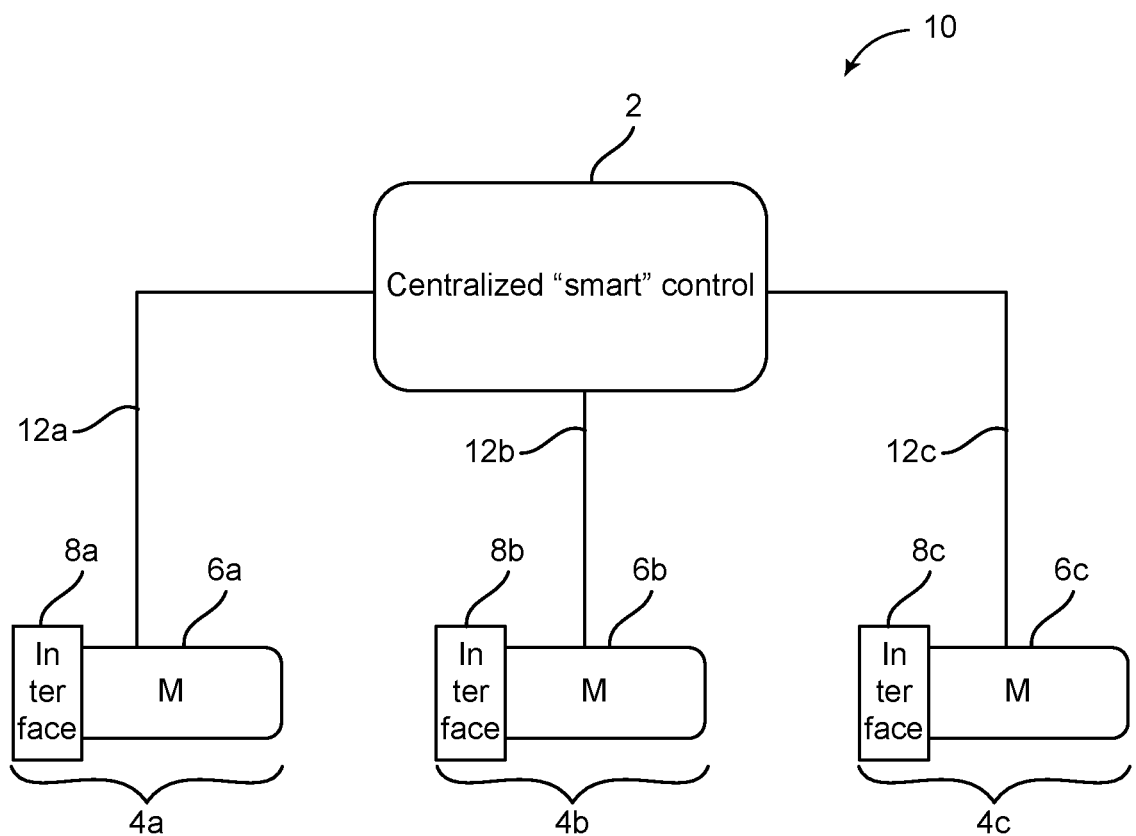
FIG. 1 is a block diagram of an electronic control system having a centralized controller for controlling multiple actuator systems according to an embodiment of the present disclosure.

The present disclosure relates to providing a centralized controller for streamlining the control of multiple electronic control units (ECUs), and their related actuator modules within a vehicle. As noted above, conventional systems have smart, expensive, complex controllers that are embedded within each of the actuator motors. The ECUs of the present application have eliminated the need for the redundancy of multiple smart controllers by providing a centralized or common smart controller with reduced logic motors. This strategy is particularly advantageous for actuators that are in close proximity to each other.

The benefits and advantages of the embodiments of this invention are varied. By centralizing the control of two different ECUs, (e.g., electrical adjustable steering wheel and power adjustable seats) it is possible to reduce the number of nodes within the ECU's, while still providing the same functionality with lower level and lower cost motor control at the actuator. In addition, by reducing the number of controller nodes in the overall network of the vehicle, a unifying interface may be utilized, which allows for smoother, faster software updates, and a centralized and uniform motor control strategy for multiple ECUs. In addition, within a vehicle application, because there are multiple ECUs that can utilize the centralized or common controller strategy described herein, the benefits and advantages of the embodiments of the present invention apply to each ECU.

The demand for more on-board computing within vehicles is continuing to drive the need for higher-speed communication between ECUs. Embodiments of the centralized controller systems provided herein may employ a novel implementation of the 1-Wire® ("hereinafter 1-Wire") protocol in order to address this need. 1-Wire technology, or the 1-Wire protocol, is a device communications bus system designed to provide low-speed data, signaling, and power over a single conductor. The basis of 1-Wire technology is a serial protocol using a single data line plus ground reference for communication. The 1-wire communication protocol uses the pulse width of the pulse width modulation (PWM) formatted pulses, rather than the number of pulses, to distinguish between the two different modes of communication.

Each 1-Wire component contains all of the logic needed to operate on a 1-Wire bus. Devices utilizing 1-Wire technology can also be interfaced directly to controllers. This feature makes 1-Wire technology well suited to the centralized controller systems and applications within vehicles as provided herein. As implied by the protocol name, 1-Wire requires just one line, plus a ground return, for data signaling. Because the 1-Wire device is parasitically powered, there is no need for an external supply voltage. Rather, power for device operation is derived from an internal power storage capacitor that parasitically stores charge when the 1-Wire line is in the high-idle state. As such, the 1-Wire protocol enables a single line to serve as a communication link and also has the ability to serve as a power transmission link. One of the benefits of applying the 1-wire protocol is relative to the smart actuators. The 1-wire protocol reduces complexity in wiring to the power supply grid. Furthermore, the electrical motor and it's Hall sensor and PWM generation interface may be closely mounted to each other, thereby reducing the wiring distance, and reducing the possibility of generating Electromagnetic Interference for other electronical equipment in the proximity.

In another embodiment, the protocol for the power transmission link is an Ethernet-based approach, namely, Power over Ethernet (PoE). PoE describes one of several systems, which passes electric power along with data on twisted pair Ethernet cabling. Power is supplied as a common-mode signal over two or more of the differential pairs of wires found in the Ethernet cables and comes from a power supply within a PoE-enabled networking device, such as an Ethernet switch that can be injected into a cable run with a midspan power supply.

In the embodiments described herein, the ECUs may communicate with each other over a network within the vehicle's computer system. For example, the communication protocol between each ECU may be one of: A-B1, AFDX, ARINC 429, Byteflight, CAN, D2B, FlexRay, DC-BUS, IDB-1394, IEBus, $I^2C$, ISO 9141-1/-2, J1708, J1587, J1850, J1939, ISO 11783, KWP2000, LIN, MOST, Multi-function Vehicle Bus, Train Communication Network, IEC 61375, SMARTwireX, SPI, VAN, and PoE using IEEE standard 802.3bt Type 4. Any proprietary adaptations to the PoE standards may also be utilized, as they relate to the 802.3bt standard.

Vehicle ECUs with Centralized Controller

FIG. 1 is a block diagram of a vehicle ECU having a centralized controller, according to an embodiment of the present disclosure. This exemplary ECU 10 includes a controller 2, which provides centralized control of each of the plurality of reduced logic actuators 4a-c. The actuators 4a-4c are each independently coupled to the controller 2. In an embodiment, the actuators 4a-4c only generate a set of basic functionalities to the corresponding motor portions 6a-c of the actuators 4a-4c, respectively. These basic functionalities may include, for example, providing PWM to the motor portion 6a-6c, PWM generation, reading of hall sensors, and basic diagnostics (e.g., measuring shorts). In addition, the plausibility of sensor data can be done at a higher level, such as controller 2, or a Master ECU (not shown). Each of the actuators 4a-4c have a corresponding interface 8a-8c, which individually couples the controller 2 to each of the actuators 4a-4c via links 12a-12c. Utilizing the interfaces 8a-8c, the controller 2 communicates with the actuators 4a-4c using a protocol, such as the 1-Wire protocol or the above-mentioned PoE interface. In accordance with the 1-Wire protocol of the PoE interface, links 12a-12c serve as a combined power and communication line for providing both power and data transmission between the controller 2 and the actuators 4a-4c. As a result, each of the actuators 4a-c do not have to be individually hooked to a power source because the single line (wire or cord) is capable of transmitting both power and data to the actuators 4a-c.

Figure 2:
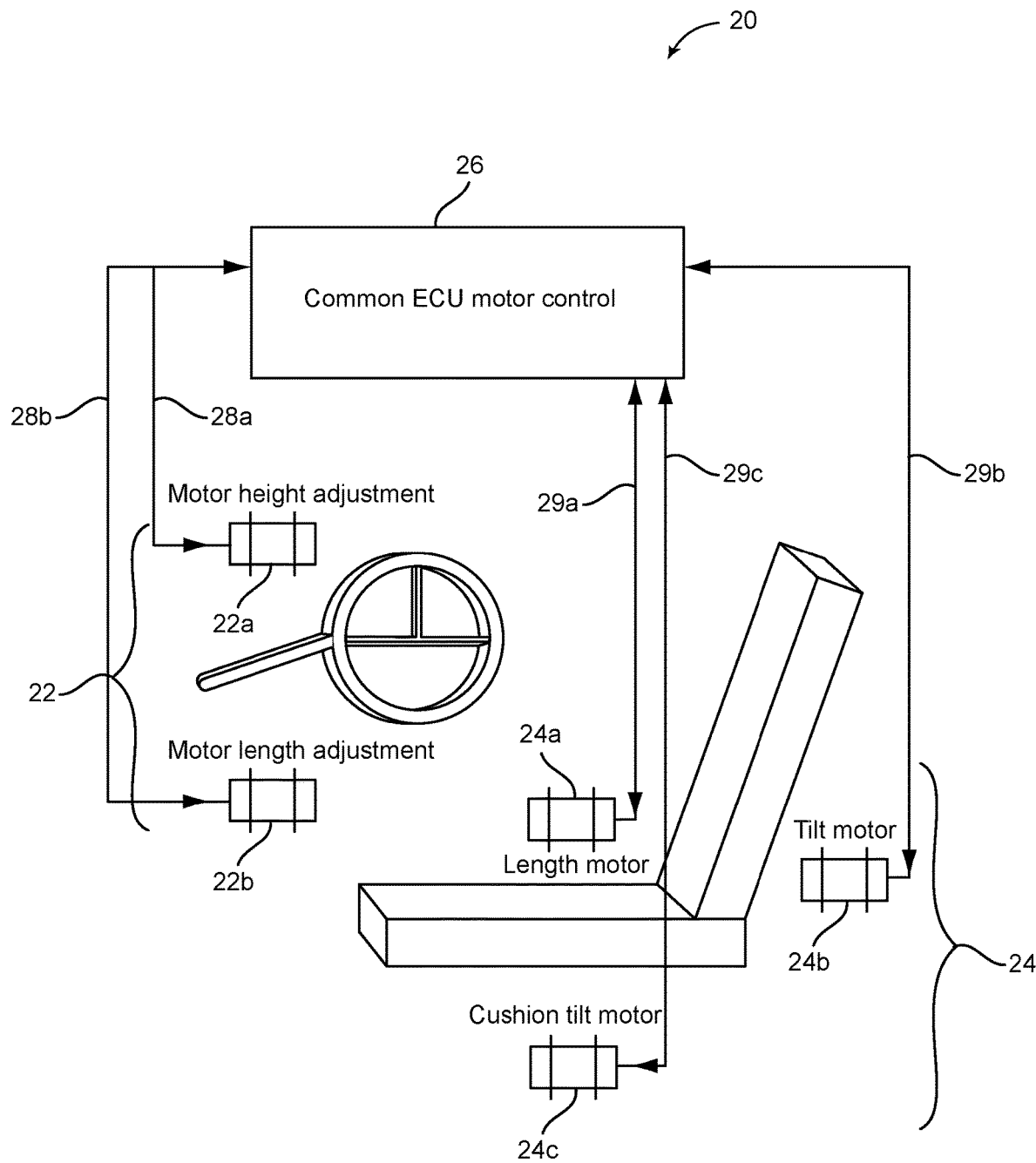
FIG. 2 is a block diagram of an electronic control system for operating a power steering wheel system and a power seat system utilizing a centralized controller according to an embodiment of the present disclosure.

FIG. 2 is a block diagram of an embodiment of an ECU 20 for operating two power control systems, namely a power steering wheel system 22 and a power seat system 24 utilizing a centralized controller 26. Power steering wheel system 22 contains two actuators 22a and 22b for providing two different features or tasks related to the same vehicle function. Specifically, actuator 22a is associated with a motorized height adjustment function, and actuator 22b is associated with a motorized length adjustment function, both of which relate to movement and positioning of the power steering wheel system 22. Power seat system 24 also has multiple actuators 24a-24c and related functions. In this example, the power seat system 24 is shown as having three motorized features or tasks related to the same function within the power seat system 24, namely: seat length—controlled by actuator 24a; seat back tilt—controlled by actuator 24b; and cushion tilt—controlled by actuator 24c. The control systems 22, 24 are coupled to the controller 26 via links 28a-28b and 29a-29c respectively. The links 28a-28b and 29a-29c may each serve as combined power and communication line for providing both power and data transmission between the controller 26 and the respective actuators 22a-22b and 24a-24c.

While the ECU 20 illustrated in FIG. 2 uses these two specific power control systems (e.g., power steering wheel system 22 and power seat system 24) and their associated vehicle functions, this is only for exemplary purposes. Those of ordinary skill in the art will understand that the strategy and implementation of the ECU 20 and controller 26 can be applied to other power control systems within the vehicle including, but not limited to: power door locks, power windows, power mirrors, power seats, power steering, and power wipers. Similarly, while not illustrated explicitly in FIG. 2, actuators 22a-22b and 24a-24c may also have communications/power interfaces (not shown) that serve to facilitate a combined power and communication line between the controller 26 and the actuators 24a-24c. In an embodiment, these interfaces are 1-Wire protocol interfaces.

Figure 3:
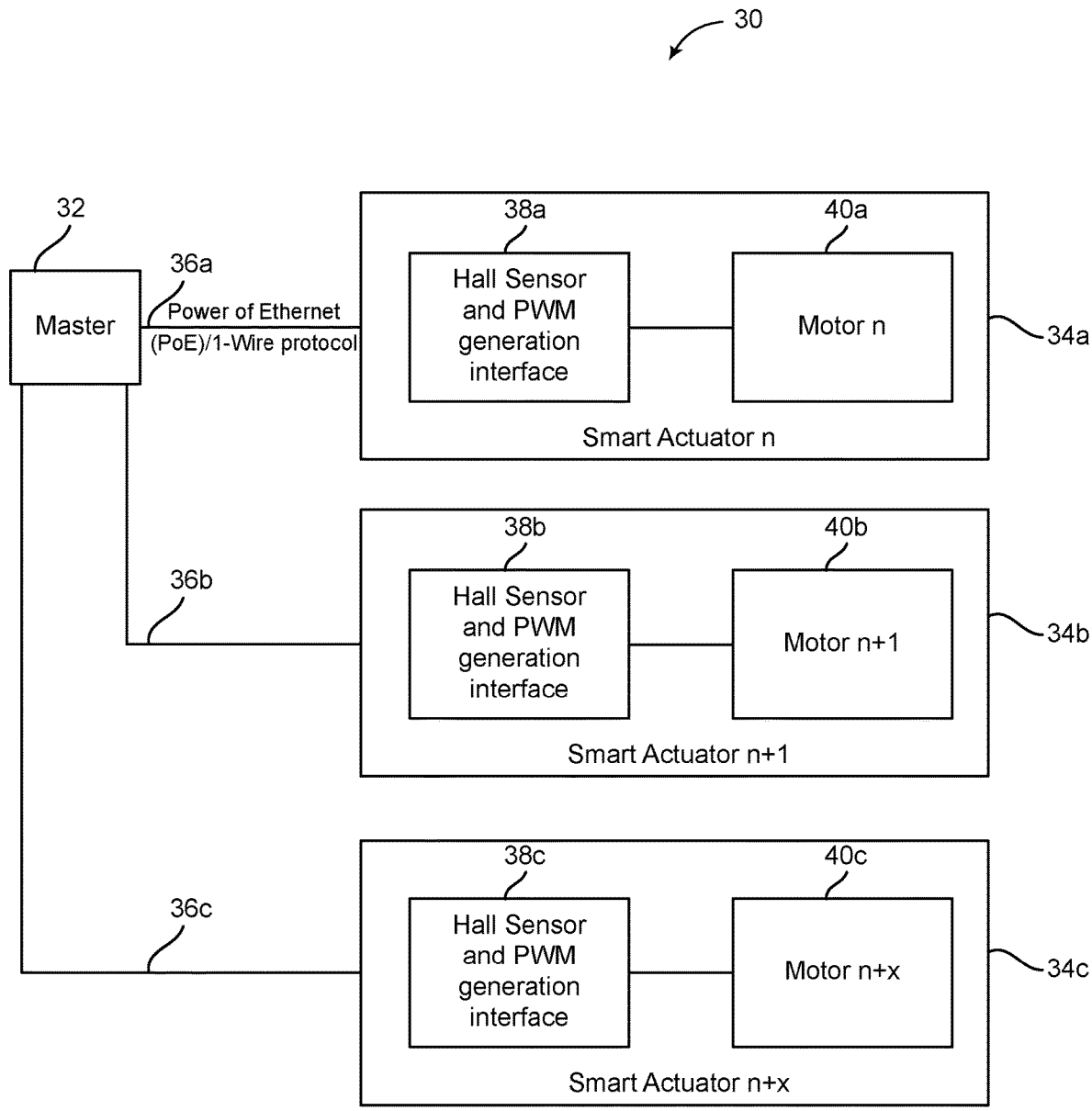
FIG. 3 is a block diagram of an electronic control system having a centralized master controller for controlling multiple smart actuators, each having at least one Hall sensor and a PWM generation interface according to an embodiment of the present disclosure.

FIG. 3 is a block diagram of an electronic control system 30 having a centralized master controller 32 for controlling multiple smart actuators n–n+x, labeled as elements 34a, 34b and 34c. The smart actuators 34a-34c control motors n–n+x, and are labeled as elements 40a-40c, respectively. Coupled to motors 40a-40c are one or more Hall sensors and a PWM generation interface 38a-38c, which are collectively pictured and labeled. The master controller 32 is connected to each of the smart actuators 34a-34c via links 36a-36c. Links 36a-36c may utilize the 1-Wire protocol for communication and/or the PoE protocol for supplying power, according to embodiments of the present disclosure. If the PoE protocol is used, additional power may be provided by using multiple wires. In an embodiment, the PoE 802.3bt Type 4 protocol is used for supplying power via links 36a-36c, or additional wires (not shown). Motors 40a-40c are illustrated as a single motor, but embodiments may include one or a plurality of motors. Because the smart actuators 34a-34c are configured to only provide simple functions such as generating a PWM and reading Hall sensor ticks, there is no need for complex software which could need updates, and robustness is emphasized.

Software Program for Operating the Centralized Controller

A non-transitory machine-readable medium on which a program is stored for providing instructions to embodiments of the controllers of the present invention is also provided. The program, when executed by a processor within the controller, provides instructions for performing various functions, such as sending an operational control signal to multiple actuators within the ECU. The program is stored in the memory of the microprocessor of the controller and is executed in conjunction with information or data received from sensors associated with one or more actuators. In accordance with embodiments of the present invention, the common controller is independently coupled to each of the actuators within the ECU. The plausibility of sensor data leads to higher level diagnostics. A master ECU has the main controller, which outputs the desired PWM and receives the actual PWM and Hall sensor ticks.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to information permanently stored on computer-readable storage mediums. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. An electronic control system within a vehicle computer system, the electronic control system comprising:
   a first actuator for performing a first vehicle function;
   a second actuator for performing a second vehicle function,
   wherein the first vehicle function is associated with a different vehicle system than the second vehicle function,
   wherein the first vehicle function is associated with one of a group of vehicle systems consisting of: power door locks, power windows, power mirrors, power seats, power steering, and power wipers, and
   wherein the second vehicle function is associated with a different one of the group of vehicle systems consisting of: power door locks, power windows, power mirrors, power seats, power steering, and power wipers; and
   a controller coupled to the first actuator via a first link and the second actuator via a second link for controlling the first actuator and the second actuator and such that each of the first actuator and the second actuator is individually coupled to the controller,
   wherein the controller is not embedded in either the first or second actuator, and
   wherein each of the first link and the second link comprises a combined data and power link.

2. The electronic control system of claim 1, wherein the controller is adapted and configured to communicate over a network using a communication protocol within the vehicle computer system.

3. The electronic control system of claim 2, wherein the communication protocol is one of $A^2B1$, AFDX, ARINC 429, Byteflight, CAN, D2B, FlexRay, DC-BUS, IDB-1394, IEBus, $I^2C$, ISO 9141-1/-2, J1708, J1587, J1850, J1939, ISO 11783, KWP2000, LIN, MOST, Multifunction Vehicle Bus, Train Communication Network, IEC 61375, SMARTwireX, SPI, VAN and PoE.

4. The electronic control system of claim 1, wherein each of the first actuator and the second actuator further comprise an interface for providing the combined communications and power supply link between the controller and each of the first and second actuators.

5. The electronic control system of claim 4, wherein the interface is one of a 1-Wire interface and a PWM generation interface.

6. The electronic control system of claim 1, wherein the first actuator comprises only a first motor and a first PWM generation interface and is capable of reading a first sensor and performing first diagnostics, and
   wherein the second actuator comprises only a second motor and a second PWM generation interface and is capable of reading a second sensor and performing second diagnostics.

7. The electronic control system of claim 1, wherein each of the first sensor and the second sensor comprises a Hall sensor.

8. The electronic control system of claim 1, wherein the controller is configured to parasitically power each of the first actuator and the second actuator.

9. The electronic control system of claim 1, wherein the first actuator comprises a power steering wheel actuator, and the second actuator comprises a power seat actuator.

10. A controller independently coupled to a first actuator and a second actuator within a vehicle, the controller comprising:
   a processor for sending, receiving and processing a data; and
   a plurality of sensors coupled to the first actuator and the second actuator for providing data to the processor,
   wherein the controller is adapted and configured to send data from the processor to the first actuator via a first link to perform a first vehicle function and the second actuator via a second link to perform a second vehicle function and such that each of the first actuator and the second actuator is individually coupled to the controller,
   wherein each of the first link and the second link comprises a combined data and power link,
   wherein the first vehicle function is associated with a different vehicle system than the second vehicle function,
   wherein the first vehicle function is associated with one of a group of vehicle systems consisting of: power door locks, power windows, power mirrors, power seats, power steering, and power wipers, and
   wherein the second vehicle function is associated with a different one of the group of vehicle systems consisting of: power door locks, power windows, power mirrors, power seats, power steering, and power wipers.

11. The controller of claim 10, wherein each of the first actuator and the second actuator further comprise an interface for providing the combined communications and power supply link between the controller and each of the first and second actuators.

12. The controller of claim 11, wherein the interface is one of a 1-Wire interface and a PWM generation interface.

13. The controller of claim 12, wherein the communication protocol is one of $A^2B1$, AFDX, ARINC 429, Byteflight, CAN, D2B, FlexRay, DC-BUS, IDB-1394, IEBus, $I^2C$, ISO 9141-1/-2, J1708, J1587, J1850, J1939, ISO 11783, KWP2000, LIN, MOST, Multifunction Vehicle Bus, Train Communication Network, IEC 61375, SMARTwireX, SPI, VAN and PoE.

14. The controller of claim 10, wherein the controller is adapted and configured to communicate over a network using a communication protocol within the vehicle.

15. The controller of claim 10, wherein the processor is adapted and configured to receive a software update for providing updated data to the first actuator and the second actuator related to performing the function within the vehicle.

16. The controller of claim 10, wherein the first actuator comprises only a first motor and a first PWM generation interface and is capable of reading a first sensor and performing first diagnostics, and wherein the second actuator comprises only a second motor and a second PWM generation interface and is capable of reading a second sensor and performing second diagnostics.

17. The controller of claim 10, wherein the controller is configured to parasitically power each of the first actuator and the second actuator.

18. A non-transitory machine-readable medium on which a program is stored for providing instructions to a controller within a vehicle control system, the program, when executed by a processor within the controller to perform the steps of:

sending a signal to a first actuator and a second actuator within the vehicle control system, wherein the program is stored in the controller, the controller being independently coupled to each of a first actuator via a first link and a second actuator via a second link within the vehicle control system, each of the first link and the second link comprising a combined data and power link wherein the first actuator performs a first vehicle function and the second actuator performs a second vehicle function, wherein the first vehicle function is associated with a different vehicle system than the second vehicle function, wherein the first vehicle function is associated with one of a group of vehicle systems consisting of: power door locks, power windows, power mirrors, power seats, power steering, and power wipers, and wherein the second vehicle function is associated with a different one of the group of vehicle systems consisting of: power door locks, power windows, power mirrors, power seats, power steering, and power wipers.

19. The non-transitory machine-readable medium of claim 18, wherein the controller is adapted and configured to communicate over a network using a communication protocol that is selected from the group consisting of: $A^2B1$, AFDX, ARINC 429, Byteflight, CAN, D2B, FlexRay, DC-BUS, IDB-1394, IEBus, $I^2C$, ISO 9141-1/-2, J1708, J1587, J1850, J1939, ISO 11783, KWP2000, LIN, MOST, Multifunction Vehicle Bus, Train Communication Network, IEC 61375, SMARTwireX, SPI, VAN and PoE.

20. The non-transitory machine-readable medium of claim 18, further comprising the steps of: performing a simultaneous software update for operation of both the first actuator and the second actuator.

* * * * *